United States Patent
Smith

(10) Patent No.: US 9,751,442 B2
(45) Date of Patent: Sep. 5, 2017

(54) HIDDEN TIE DOWN METHOD

(71) Applicant: LEAR CORPORATION, Southfield, MI (US)

(72) Inventor: Rodger G. Smith, Shropshire (GB)

(73) Assignee: Lear Corporation, Southfield, MI (US)

( * ) Notice: Subject to any disclaimer, the term of this patent is extended or adjusted under 35 U.S.C. 154(b) by 285 days.

(21) Appl. No.: 14/789,299

(22) Filed: Jul. 1, 2015

(65) Prior Publication Data

US 2016/0031350 A1   Feb. 4, 2016

Related U.S. Application Data

(60) Provisional application No. 62/031,006, filed on Jul. 30, 2014.

(51) Int. Cl.
*B60N 2/58* (2006.01)

(52) U.S. Cl.
CPC ......... *B60N 2/5833* (2013.01); *B60N 2/5825* (2013.01); *B60N 2/5891* (2013.01)

(58) Field of Classification Search
CPC .. B60N 2/6036; B60N 2/6027; B60N 2/5833; B60N 2/5891; B60N 2/5825; B60N 2/5883
See application file for complete search history.

(56) References Cited

U.S. PATENT DOCUMENTS

| | | | | |
|---|---|---|---|---|
| 5,028,472 | A * | 7/1991 | Gray | B60N 2/5833 150/158 |
| 5,096,639 | A * | 3/1992 | Hughes | B29C 44/1238 264/257 |
| 5,326,150 | A * | 7/1994 | Robinson | B60N 2/5891 297/218.2 |
| 5,372,667 | A * | 12/1994 | Miyota | A47C 7/18 156/213 |
| 5,647,943 | A | 7/1997 | Kozlowski | |
| 6,340,513 | B1 * | 1/2002 | Hammond | B32B 27/12 15/215 |
| 6,406,588 | B1 | 6/2002 | Sheetz et al. | |
| 6,588,838 | B1 * | 7/2003 | Dick, Jr. | B60N 2/449 280/730.1 |
| 6,886,479 | B1 * | 5/2005 | Hori | B60N 2/5883 112/470.27 |
| 7,172,246 | B1 * | 2/2007 | Itakura | B60N 2/6036 297/219.1 |
| 7,322,597 | B2 * | 1/2008 | Tracht | B60R 21/207 280/728.3 |
| 7,380,812 | B2 * | 6/2008 | Tracht | B60R 21/207 280/728.3 |
| 7,445,740 | B1 * | 11/2008 | Poulakis | B60N 2/5891 264/173.16 |

(Continued)

*Primary Examiner* — Timothy J Brindley
(74) *Attorney, Agent, or Firm* — Brooks Kushman P.C.

(57) ABSTRACT

A method for making a vehicle seat trim component including a step of providing a first foam component that includes a first foam layer and a flexible component. The flexible component is sewn to the first foam layer and defining cutout sections and end sections. A second foam component is attached to the first foam component to form a compound foam structure. The second foam component includes a second foam layer and an exterior layer. A pattern is sewn into the compound foam structure avoiding the end sections.

19 Claims, 6 Drawing Sheets

(56) References Cited

U.S. PATENT DOCUMENTS

| | | | | |
|---|---|---|---|---|
| 2001/0022459 A1* | 9/2001 | Matsushima | A47C 7/425 | 297/284.4 |
| 2004/0154511 A1* | 8/2004 | Takei | B60N 2/5883 | 112/475.17 |
| 2004/0195877 A1* | 10/2004 | Demain | B29C 33/12 | 297/218.2 |
| 2004/0239163 A1* | 12/2004 | Runk | B60N 2/26 | 297/219.12 |
| 2005/0081771 A1* | 4/2005 | Kromm | D05B 23/00 | 112/475.08 |
| 2005/0160956 A1* | 7/2005 | Guy | B60N 2/5883 | 112/475.08 |
| 2007/0035165 A1 | 2/2007 | Zahel | | |
| 2011/0053448 A1* | 3/2011 | Hobl | A47C 31/10 | 442/181 |
| 2012/0133194 A1* | 5/2012 | Takehara | A47C 31/023 | 297/452.58 |
| 2012/0187731 A1* | 7/2012 | Guadagno | B60N 2/5833 | 297/218.2 |
| 2013/0161998 A1* | 6/2013 | Uebelacker | B60N 2/646 | 297/452.1 |
| 2014/0042767 A1* | 2/2014 | Filipp | B32B 7/08 | 296/70 |
| 2014/0283343 A1* | 9/2014 | Okawa | A44B 18/0034 | 24/449 |
| 2015/0132422 A1* | 5/2015 | Yamada | B29C 31/008 | 425/3 |
| 2015/0165947 A1* | 6/2015 | Clauser | B60N 2/5825 | 297/452.18 |
| 2016/0068089 A1* | 3/2016 | Huebner | B60N 2/60 | 297/228.13 |
| 2016/0152111 A1* | 6/2016 | Tuskes | B60N 2/5685 | 219/217 |
| 2016/0167260 A1* | 6/2016 | Thomas | B32B 5/18 | 428/304.4 |
| 2016/0368405 A1* | 12/2016 | Ishii | B60N 2/5891 | |
| 2017/0080839 A1* | 3/2017 | Bourde | B60N 2/5883 | |

* cited by examiner

HIDDEN TIE DOWN METHOD

CROSS-REFERENCE TO RELATED APPLICATIONS

This application claims the benefit of U.S. provisional application Ser. No. 62/031,006 filed Jul. 30, 2014, the disclosure of which is hereby incorporated in its entirety by reference herein.

TECHNICAL FIELD

The present invention is related to attachment of covers for vehicle seats.

BACKGROUND

Seat components typically include a trim cover, usually made of some type of flexible upholstery sheet such as fabric or synthetic leather, attached to a cushion. The cushion used for occupant seating is usually constructed with at least one trench or groove, and more typically with several trenches or grooves on its upper surface. The upholstery sheet typically includes sew lines formed by connecting sheets together or by decorative patterning. In either scenario, attachment mechanisms are used to attach the upholstery sheet to the cushion.

Some prior art methods for attaching the trim cover to the cushion involve the use of hog rings. In those methods, the seam is typically attached to a series of hog rings which are then attached to a metal wire that runs through the cushion generally parallel to the upper surface of the cushion. This process may be difficult to use because it requires inserting the wire through the cushion in order to provide the support needed for the hog rings. In addition, the process used for attaching the hog ring to the support wire may be cumbersome, and the materials used may be expensive compared to other alternatives.

Another method involves hooks and loops such as attaching a male strip of VELCRO™ to the seam and attaching a female strip (i.e., loop material) of VELCRO™ within the trenches in the cushion. The seam can then be secured within the trench by the VELCRO™ strip. Sometimes, the male or female Velcro is added to the cover. A potential problem with this method is that because of the inherent readily releasable nature of VELCRO™, the seam may become unintentionally detached from the cushion. Maintaining proper alignment of the seam may also be difficult when using VELCRO™.

Other prior art methods involve using some form of adhesive to attach the upholstery sheet seam to the cushion within the trenches. But this technique can pose a relatively significant problem if the seat component needs to be reupholstered, as adhesives are intended to be permanent attachments. Maintaining proper alignment of the seam may be difficult with adhesives as well.

Accordingly, there is a need for trim cover fasteners that are relatively easy to fabricate and use, that provide a relatively secure manner of attaching a trim cover to a cushion, and that could be detached relatively easily to allow for reupholstering.

SUMMARY

The present invention solves one or more problems of the prior art by providing, in at least one embodiment, a method for making a vehicle seat trim component. The method includes a step of providing a first foam component that includes a first foam layer and a flexible component. The flexible component is attached to the first foam layer and defines cutout sections and end sections. A second foam component is attached to the first foam component to form a compound foam structure. The second foam component includes a second foam layer and an exterior layer. A pattern is sewn into the compound foam structure with stitch lines avoiding the end sections while passing through the cutout sections.

In another embodiment, a vehicle trim component made by the method set forth above is provided. The vehicle trim component includes a first foam layer having a first side and a second side. A tie down layer is sewn to the first foam layer on the first face. The tie-down layer includes an attachment section which is attached to the foam layer and an extension section which extends away from the first foam layer. Characteristically, the extension section defines cutout sections and end sections. The vehicle trim component also includes a second foam layer having a first face and a second face. The first face of the second foam layer is disposed over the second side of the first foam layer. An exterior layer is disposed over the second face of the second foam layer. A pattern is defined by sew lines extending between the first foam layer and the exterior layer with the sew lines avoiding the end sections by passing through the cutout sections.

In another embodiment, a vehicle trim component is provided. The trim component includes a foam layer having a first side and a second side, a hook and loop fastener disposed over the first side, and an exterior layer disposed over the second side of the foam layer. A pattern is defined by sew lines extending between the exterior layer, the foam layer and the hook and loop fastener such that the sew lines attach the hook and loop fastener to the foam layer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
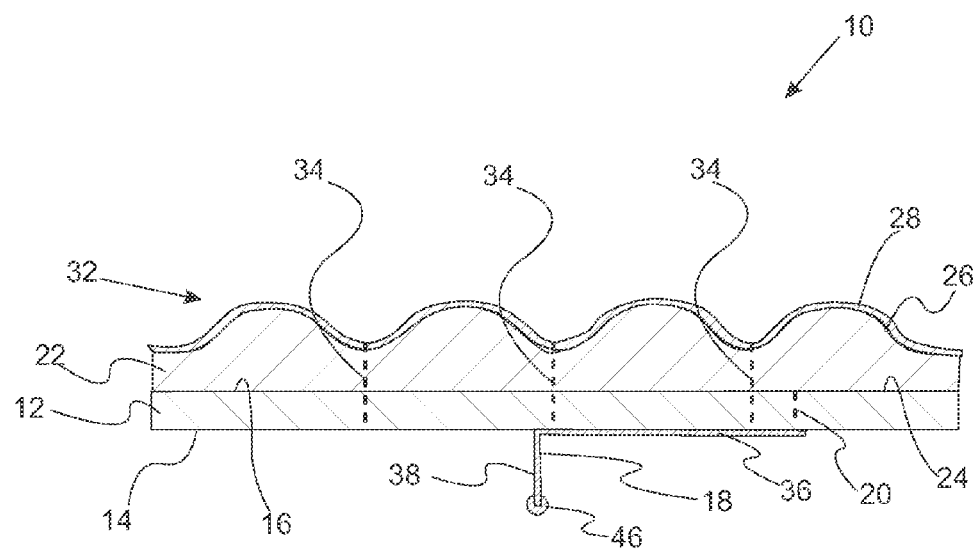
FIG. 1A provides a cross section of a trim layer with a tie-down.
Figure 1B:
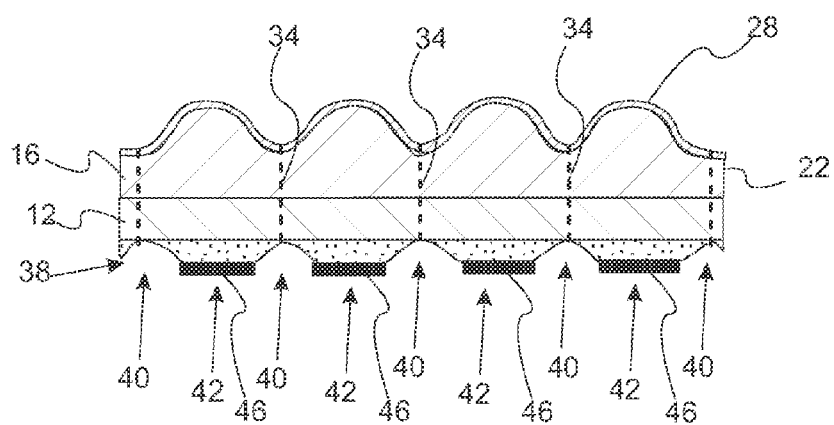
FIG. 1B provides a partial cross-section showing the front face of the tie-down of FIG. 1A.

With reference to FIGS. 1A-B, schematics of a vehicle seat component having a tie-down are provided. FIG. 1A provides a cross section of a trim layer with a tie-down. FIG. 1B provides a partial cross-section showing the front face of the tie-down. Trim component 10 includes foam layer 12 which includes first side 14 and second side 16. Tie down 18 is attached to foam layer 12 in a manner such as by sewing, as indicated by stitch lines 20. Typically, the body of tie-down 18 includes a flexible sheet, preferably of fabric such as fleece. In other variations, the fabric sheet may be a woven or non-woven fabric so long as the sheet has sufficient flexibility to be easily bent. Trim component 10 includes foam layer 22 which includes first face 24 and second face 26. Exterior layer 28 is disposed over foam layer 22 such that exterior layer 28 is attached to second face 26.

Trim component 10 includes a pattern 32 that is defined by sewing as indicated by sewn lines 34 which also attach to tie-down 18 as indicated. In general, pattern 32 is a corrugated pattern and, in particular, a diamond pattern as set forth below. Tie-down 18 includes attachment section 36 which is attached to foam layer 12 and extension section 38 which extends away from foam layer 20. Extension section 38 includes cutout sections 40 and end sections 42. Cutout sections 40 advantageously accommodate sew lines 34 during fabrication as set forth below in more detail. End sections 42 are capped with plastic bead 46.

Figure 2:
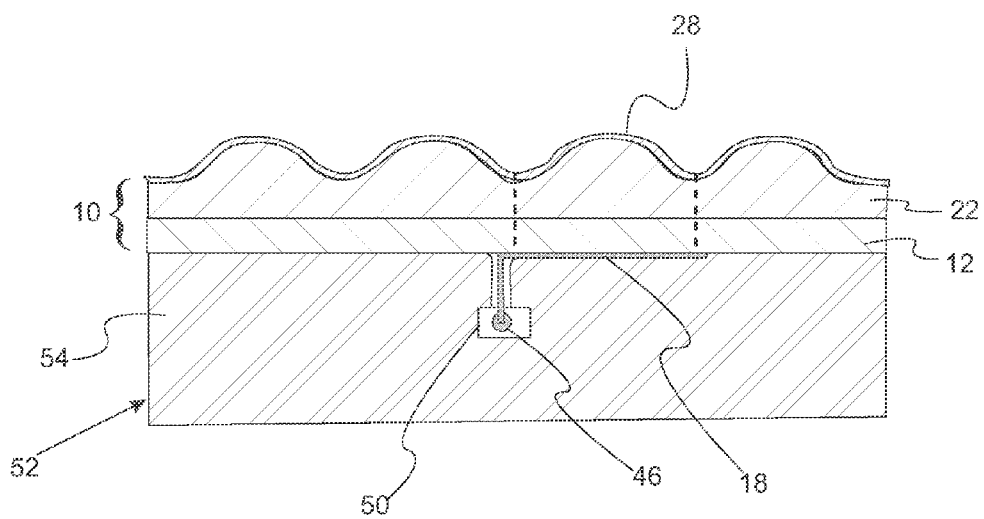
FIG. 2 provides a cross-section of a tie-down attached to a vehicle seat component.

With reference to FIG. 2, a schematic cross-section of tie-down 18 attached to a vehicle seat component is provided. In the illustration of FIG. 2, plastic bead 46 is inserted into clip 50 of seat component 52. In a variation, clip 50 is embedded in foam section 54 of seat component 52.

Figure 3A:
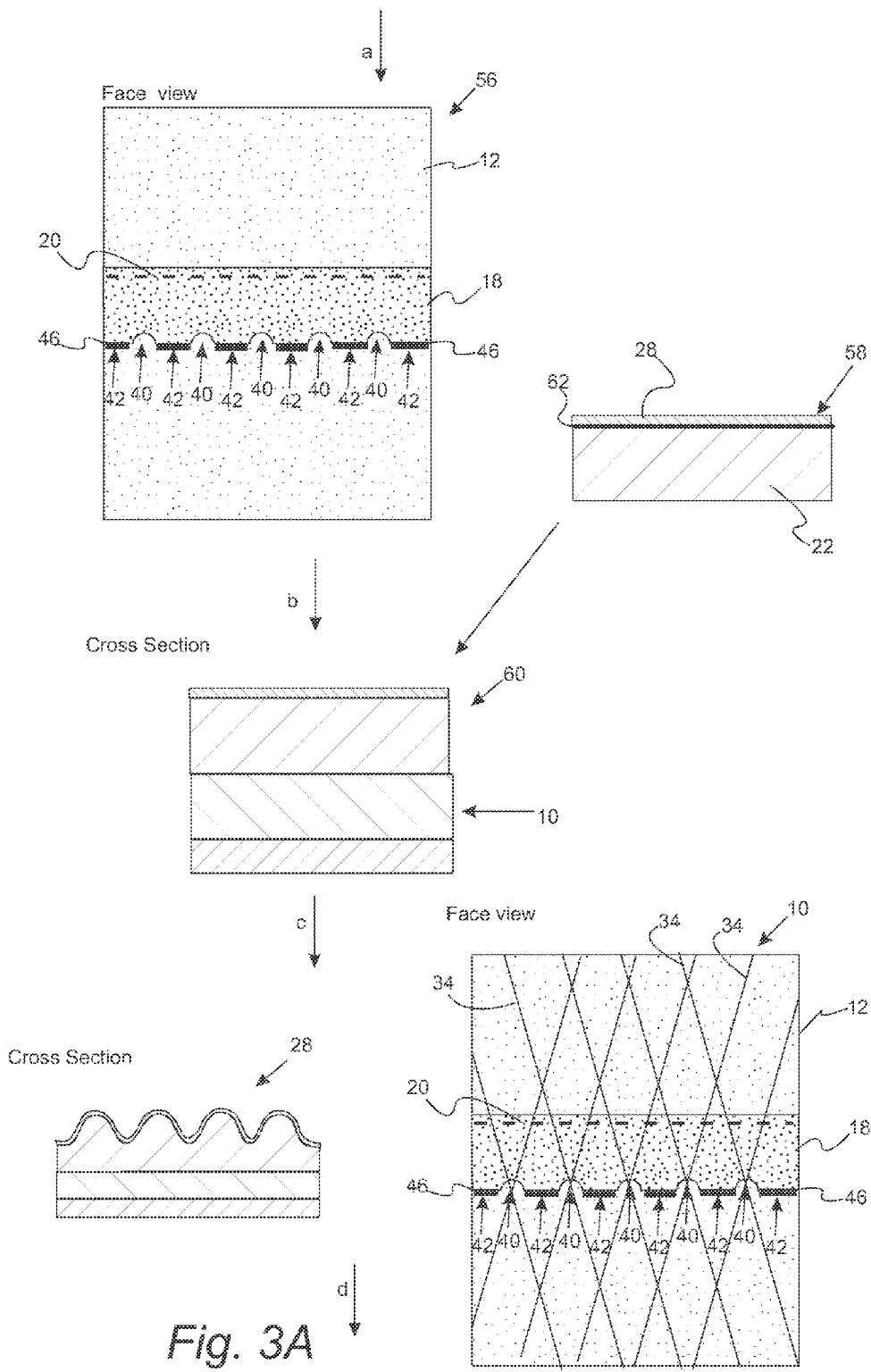
FIG. 3A provides a schematic flow chart illustrating the fabrication of a trim component having a sewn in tie-down.
Figure 3B:
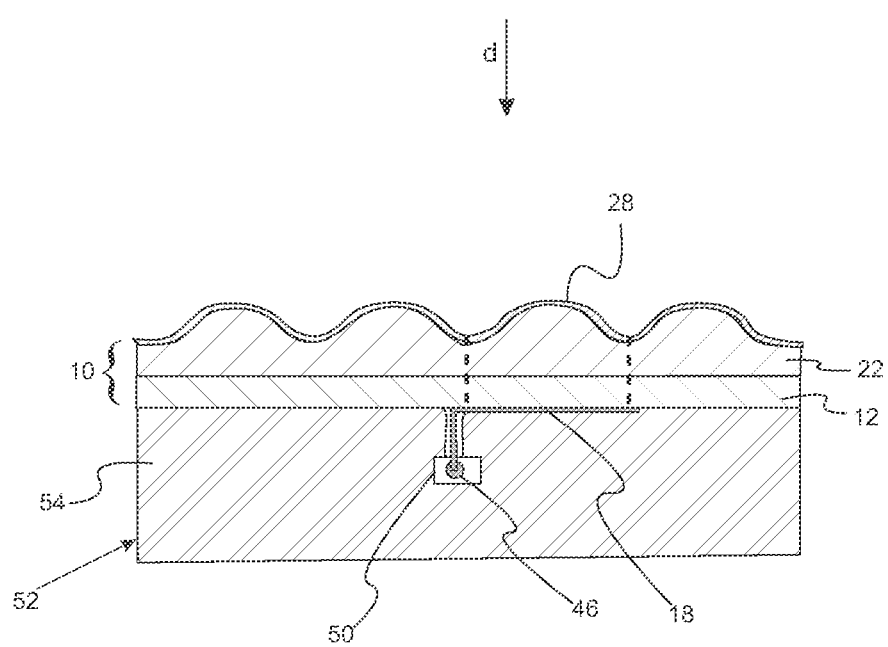
FIG. 3B is a continuation of FIG. 3A.

With reference to FIGS. 3A and 3B, a schematic flow chart illustrating the fabrication of a trim component having a sewn in tie-down is provided. In step a), first foam component 56 (face view) includes foam layer 12 and tie-down component 18. Tie-down component 18 (e.g., a flexible fabric sheet such as fleece) is sewn to foam layer 12 as indicated by sew line 20. Tie-down component 18 defines cutout sections 40 and end sections 42. End sections 42 are capped with plastic bead 46. In step b), second foam component 58 (cross sectional view) is attached to first foam component 56 with an adhesive to form compound structure 60 shown in cross section. Second foam component 58 includes foam layer 22, exterior layer 28 (e.g., leather), and fabric layer 62 (e.g., a loose weave fabric such as a KUFNER™ layer). In step c), a diamond pattern is sewn into compound structure 60 with sew lines 34 avoiding end sections 42 and in particular, avoiding plastic beads 46. After sewing, end sections 42 can be assembled to a clip in a vehicle seat component as indicated by step d).

Figure 4:
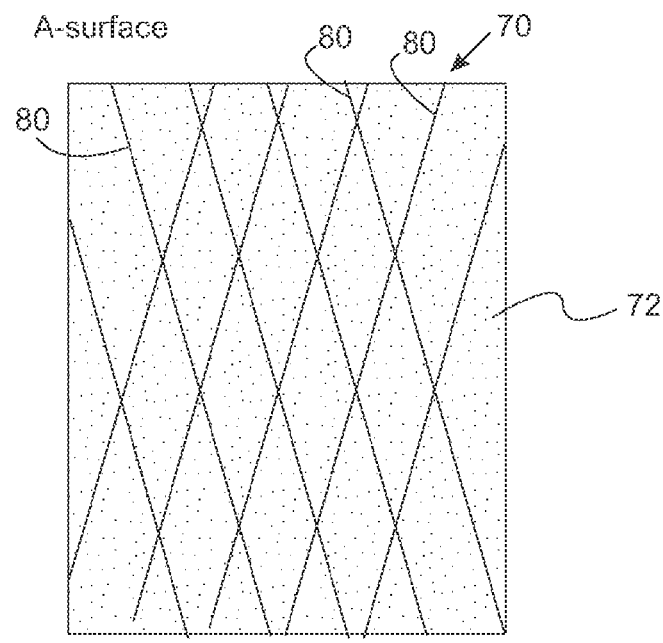
FIG. 4 is a surface view of the A surface of a trim component having a hook and loop fastener.
Figure 5:
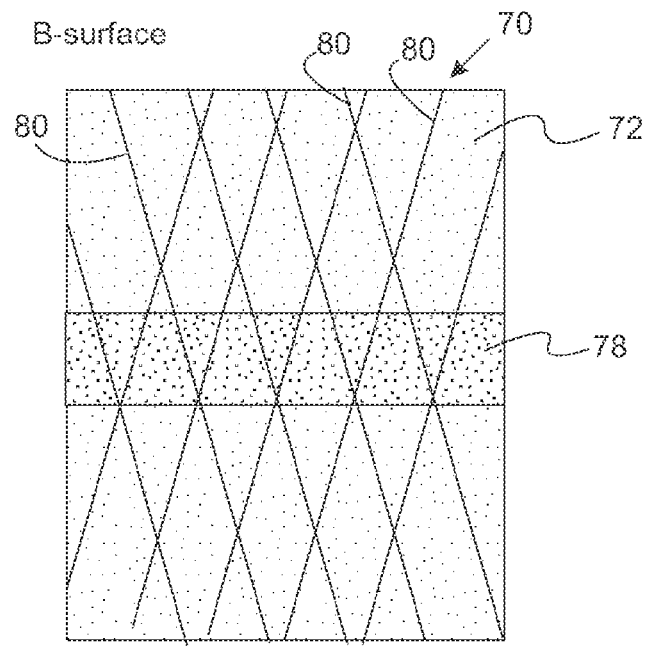
FIG. 5 is a surface view of the B surface of the trim component of FIG. 4
Figure 6:
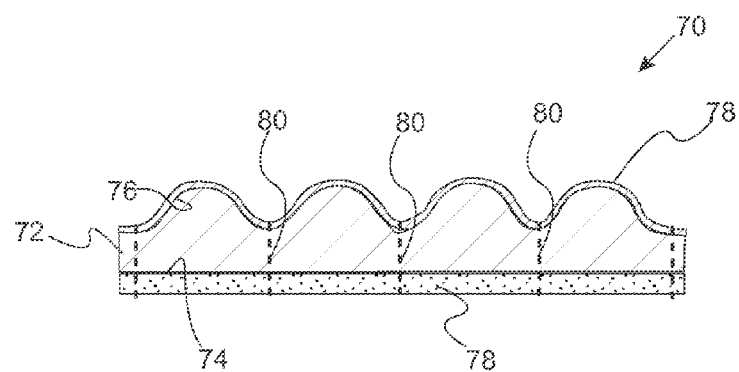
FIG. 6 is a cross-section of the trim component of FIG. 4.

With reference to FIGS. 4-6, schematics of a vehicle seat component having a hook and loop fastener are provided. FIG. 4 is a surface view of the A surface of a trim component while FIG. 5 is a surface view of the B surface of a trim component. In this context, the A surface is the surface that is viewed or visible after final installation in a vehicle, while the B surface is not a viewed or visible surface after installation. FIG. 6 is a cross-section of the trim component. Trim component 70 includes foam layer 72 which includes first side 74 and second side 76. Exterior layer 78 is disposed over second side 76. Hook and loop fastener 79 (e.g., Velcro) is positioned over first side 74 of foam layer 72. A pattern, and in particular, a crisscrossing pattern is sewn through exterior layer 78, foam layer 72, and hook and loop fastener 79 such that the fastener is attached to the foam layer. In particular, sew lines 80 extend from exterior layer 78 through hook and loop fastener 79.

Figure 7:
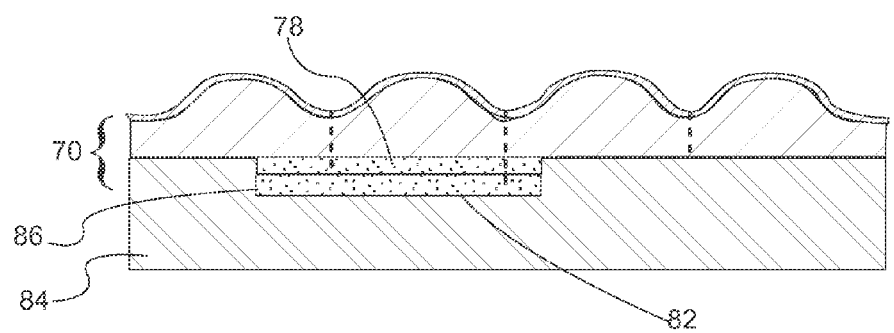
FIG. 7 is a schematic cross-section of a hook and loop fastener attached to a vehicle seat component.

With reference to FIG. 7, a schematic cross-section of hook and loop fastener 79 attached to a vehicle seat component is provided. In the illustration of FIG. 7, hook and loop fastener 79 mates to hook and loop fastener 82 which is attached to vehicle seat component 84. In a refinement, hook and loop fastener 82 is positioned in trench 86 of vehicle seat component 84.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for making a vehicle seat component, the method comprising:
    a) providing a first foam component that includes a first foam layer and a flexible component, the flexible component being attached to the first foam layer, the flexible component defining cutout sections and end sections;
    b) attaching a second foam component to the first foam component to form a compound foam structure, the second foam component including a second foam layer and an exterior layer; and
    c) sewing a pattern into the compound foam structure passing through the cut out sections and avoiding the end sections.

2. The method of claim 1, wherein:
    the flexible component comprises fabric; and
    the flexible component is attached to the first foam layer by sewing.

3. The method of claim 1 further comprising attaching the end sections to clips in a vehicle seat component.

4. The method of claim 1 wherein the flexible component includes fleece.

5. The method of claim 1 wherein the end sections are capped with a plastic bead.

6. The method of claim 1 wherein the exterior layer includes leather.

7. The method of claim 1 wherein a fabric layer is interposed between the second foam layer and the exterior layer.

8. The method of claim 1 wherein the second foam component is attached to the first foam component with an adhesive.

9. The method of claim 1 wherein the flexible component includes an attachment section which is attached to the first foam component and an extension section which extends away from the first foam component, the extension section defining the cutout sections and end sections.

10. The method of claim 1 wherein the pattern is a diamond pattern.

11. A vehicle trim component comprising:
    a first foam layer having a first side and a second side;
    a tie down layer sewn to the first foam layer on the first side, the tie down layer including an attachment section which is attached to the first foam layer and an extension section which extends away from the first foam layer, the extension section defining cutout sections and end sections;

a second foam layer having a first face and a second face, the first face of the second foam layer disposed over the second side of the first foam layer; and an exterior layer disposed over the second face of the second foam layer, wherein a pattern is defined by sew lines extending between the first foam layer and the exterior layer, the sew lines avoiding the end sections by passing through the cutout sections.

12. The vehicle trim component of claim 11 wherein the sew lines avoid the end sections by passing through the cutout sections.

13. The vehicle trim component of claim 11 further comprising plastic bead positioned on the end sections.

14. The vehicle trim component of claim 11 attached to clips in a vehicle seat component.

15. The vehicle trim component of claim 11 wherein the tie down layer includes fleece.

16. The vehicle trim component of claim 11 wherein the exterior layer includes leather.

17. The vehicle trim component of claim 11 further comprising a fabric layer interposed between the second foam layer and the exterior layer.

18. The vehicle trim component of claim 11 wherein the second foam layer is attached to the first foam layer with an adhesive.

19. The vehicle trim component of claim 11 wherein the pattern is a diamond pattern.

\* \* \* \* \*